UNITED STATES PATENT OFFICE.

JOHN C. MARTIN, OF RICHMOND, GREAT BRITAIN.

IMPROVEMENT IN MANUFACTURE OF WHITE LEAD.

Specification forming part of Letters Patent No. 207,364, dated August 27, 1878; application filed November 16, 1877; patented in England, April 4, 1877.

*To all whom it may concern:*

Be it known that I, JOHN COWDERY MARTIN, of 5 Upper Hill street, Richmond, in the county of Surrey and Kingdom of Great Britain, have invented certain Improvements in the Manufacture of White Lead, of which the following is a specification:

I prepare a peculiar hydrated suboxide of lead by the abrasion of small granulated pieces of metallic lead inclosed within a revolving case perforated to admit the air and produce oxidation. I prefer the case to be of a square form of section revolving on its axis longitudinally. A stream of water passing into it through hollow bearings, on which it revolves, and passing out through the perforations, carries with it the suboxide; or, instead of a stream of water passing through the case, the latter may be made to revolve partly in water. I then grind or mix this suboxide of lead so produced with white lead produced by precipitation, or with other white lead that may be deficient in body or density, or which requires an undue quantity of oil for its conversion by grinding into paint. I prefer that the precipitated lead to be operated upon should contain a slight excess of carbonic acid over stack lead, average samples of which appear to consist of two parts of neutral carbonate to one of hydrated oxide. This composition is not absolutely essential; but soft lead may be produced by it, and it assists the subsequent combination. I mix under pressure, or grind with the lead in a dry condition, one-half per cent. or less, by weight, of the suboxide. I have found eight pounds impart to a ton of precipitated lead of the above composition all the properties of stack-made lead, the crystalline particles appearing to be broken and to have become amorphous, and the bulk reduced after treatment, so that one hundred and sixty-six parts, by weight, would occupy no more space than one hundred and fourteen parts required before, the lead oxide appearing to have entered into combination with the carbonic acid, and to have become converted into white lead with the due proportion of hydrated oxide to the neutral carbonate as it exists in white lead of the ordinary formation.

I have described the manner of producing the suboxide which I have found gives the best results; but other oxides of lead will produce an effect more or less analogous, the lower or suboxides, as the black or gray, producing the better effect, as they become more easily hydrated and pass into a carbonate in a dry or nearly dry state.

What I claim as new, and desire to secure by Letters Patent, is—

1. In the manufacture of white lead, the combination of white lead which is deficient in density with suboxide of lead, substantially in the proportions specified.

2. In the manufacture of white lead, the combination of white lead that is deficient in density with the herein-described suboxide of lead, substantially in the proportions specified.

J. C. MARTIN.

Witnesses:
   S. E. GUNYON,
     *Victoria Grove, Stoke Newington.*
   W. I. SONGHURST,
     *Gibson Square, Islington.*